United States Patent [19]

McNamara, Jr.

[11] 4,047,076
[45] * Sept. 6, 1977

[54] EMERGENCY LIGHTING SYSTEM FOR GASEOUS DISCHARGE LAMPS

[75] Inventor: Albert C. McNamara, Jr., Houston, Tex.

[73] Assignee: Esquire, Inc., New York, N.Y.

[ * ] Notice: The portion of the term of this patent subsequent to June 23, 1987, has been disclaimed.

[21] Appl. No.: 628,055

[22] Filed: Nov. 3, 1975

Related U.S. Application Data

[60] Continuation of Ser. No. 429,991, Jan. 2, 1974, which is a continuation of Ser. No. 231,870, March 6, 1972, abandoned, which is a continuation of Ser. No. 13,519, Feb. 24, 1970, abandoned, which is a division of Ser. No. 728,970, May 14, 1968, Pat. No. 3,517,254.

[51] Int. Cl.$^2$ ............................................. H05B 37/00
[52] U.S. Cl. ........................................ 315/88; 315/91; 315/92; 315/182
[58] Field of Search ....................... 307/73; 315/86, 87, 315/88, 89, 91, 92, 93, 116, 129, 135, 136, 182, 192

[56] References Cited

U.S. PATENT DOCUMENTS

| | | | |
|---|---|---|---|
| 1,970,519 | 8/1934 | Dorgelo | 315/192 X |
| 2,043,023 | 6/1936 | Westendorp | 315/116 X |
| 2,076,278 | 4/1937 | Ryde et al. | 176/124 |

FOREIGN PATENT DOCUMENTS

| | | | |
|---|---|---|---|
| 1,167,444 | 4/1964 | Germany | |
| 377,937 | 7/1964 | Switzerland | 315/92 X |

OTHER PUBLICATIONS

Galloway, J. H. – "Using the Triac for Control of AC Power" — General Electric Application Note 200.35, 3/66, p. 15.
Stern–"Silicon Controlled Rectifiers-New Applications in the Home"—*Electronics World*, pp. 27–30, 82: Oct. 1963.
*Silicon Controlled Rectifier Manual* (Gen. Elec.), pp. 89–90, (1961).
*Transistor Manual* (Gen. Elec.), p. 331 (1964).

*Primary Examiner*—Lawrence J. Dahl
*Attorney, Agent, or Firm*—Arnold, White & Durkee

[57] ABSTRACT

This invention pertains to an emergency lighting circuit that operates with a high pressure, gaseous-discharge lamp and associated ballast. When the gaseous-discharge lamp goes out, after once being ignited, sufficient current is supplied to an incandescent light or lights to maintain illumination to the area normally illuminated by the lamp. The device for providing this current may vary, but generally incorporates a voltage breakdown means that receives higher voltage from the ballast when there is failure of the gaseous-discharge lamp than when the arc therein is struck. A preferred embodiment also lights the incandescent lights during initial warm-up of the gaseous-discharge lamp. The incandescent lights may also be used in a cold environment to maintain the gaseous-discharge lamp sufficiently above an ambient temperature level to make possible initial striking of the arc in the lamp when ambient temperature conditions might otherwise prevent it. Further, half-cycles of ballast output voltages are blocked by diodes and capacitors are used to increase the applied voltage to enhance restriking of the gaseous-discharge lamp in additional embodiments.

13 Claims, 15 Drawing Figures

EMERGENCY LIGHTING SYSTEM FOR GASEOUS DISCHARGE LAMPS

CROSS-REFERENCE TO RELATED APPLICATIONS

This is a continuation of U.S. patent application Ser. No. 429,991, filed Jan. 2, 1974; which was a continuation of U.S. patent application Ser. No. 231,870, filed Mar. 6, 1972, now abandoned; which was a continuation of U.S. patent application Ser. No. 13,519, filed Feb. 24, 1970, now abandoned; which was a division of U.S. patent application Ser. No. 728,970, filed May 14, 1968, now U.S. Pat. No. 3,517,254, issued June 23, 1970.

BACKGROUND OF THE INVENTION

1. Field of the Invention

This invention pertains to illumination devices and more particularly to emergency lighting circuits used in connection with gaseous-discharge lamps.

2. Description of Prior Art

Gaseous-discharge lamps, such as mercury vapor and other metallic-additive vapor lamps, have long been employed in industrial lighting situations because of their extremely high efficiency when compared to other sources, such as incandescent lights.

A gaseous-discharge lamp is a source of radiant energy characterized by the emission of radiation from a stream of ionized vapor-carrying current between electrodes in the lamp. In starting the lamp, a relatively large voltage is required. However, once current flows in the lamp, the lamp exhibits a negative resistance characteristic. That is, the resistance of the lamp decreases with an increase in current. In common use in the United States are fluorescent, mercury and neon lamps.

To more fully discuss the operation of circuits of the present invention, it is first necessary to understand more fully the operation of these gaseous-discharge lamps. Typical of such lamps is the mercury-vapor lamp, which is used as an example for purposes of discussion.

The mercury-vapor lamp contains an arc tube filled with argon gas and a small amount of pure mercury. The arc tube is usually mounted within an outer bulb of glass. The arc tube itself is usually made of fused quartz. One main electrode extends into the tube from one end and a similar main electrode and a smaller starting electrode are at the other end of the tube. The starting electrode is electrically connected through a high resistance to the main electrode at the opposite end of the tube.

The mercury lamp is connected through its socket to the output leads of its ballast, which supplies proper voltage for starting and limits current during operation. When the ballast circuit is first energized, no current flows, and full starting voltage appears between the starting electrode and the adjacent main electrode. This voltage draws electrons across the relatively short gap, ionizing some of the argon gas in the tube and setting up a glow discharge between these two electrodes. The resistor in the circuit limits current to a few milliamperes. The ionized argon gradually diffuses through the tube, reducing the resistance in the gap between main electrodes. When resistance is low enough, an arc strikes across the main electrodes. The heat from the arc vaporizes the droplets of mercury, and they become inoized current-carriers as electrons in the arc bombard the vaporized mercury atoms. When all the mercury is vaporized, the current in the arc may reach several amperes. With this current flowing in the ballast, it no longer produces sufficient voltage to maintain the initial glow, which is extinguished. The arc is then maintained across the main electrodes with its current limited by the ballast.

If the arc is extinguished by a momentary power failure or deliberate disconnection of the power supply, it cannot be restarted immediately. While the arc tube is still hot, the pressure created by the still-vaporized mercury is too high to permit the formation of the glow discharge at the starting electrode. A cooling period, ordinarily on the order of about five minutes, is necessary to allow the mercury to condense on the arc-tube walls, lowering the pressure sufficiently for the process to begin again.

The prospect of being without light for a period of time in the presence of just a temporary cessation of power has meant that fluorescent lights have been used in installations were gaseous-discharge lamps would have otherwise been preferred.

Also, in a very cold environment, the possibility that an initial glow discharge at the starting electrode will not be initiated is a distinct probability. The ambient temperature where striking of an arc may normally be considered assured for most gaseous-discharge lamps is 50° F. When the temperature is expected to be lower than this level, and particularly where the temperature is expected to be appreciably lower than this level, the unreliable starting performance of such lamps has meant that gaseous-discharge lamps have not been used where they would have been otherwise. Before the present invention, when gaseous-discharge lamps are used in a low temperature situation, it has been necessary to use expensive ballasts having higher internal losses than ballasts normally employed.

Among the objects and the advantages of the present invention is to overcome these two principal shortcomings by providing an emergency lighting circuit that will light in the event that the gaseous-discharge lamp with which it operates fails. Also, certain embodiments of the present invention include locating the incandescent lights of the emergency lighting circuit to raise the ambient operating temperature of the gaseous-discharge lamp, thereby aiding its ignition.

The various types of vapor lamps all possess a negative resistance characteristic, wherein the resistance within the lamp envelope decreases with an increase in current. Without some form of current-limiting device in the electric circuit, current would rise swiftly after the lamp started until lamp failure occurred. This current-limiting element is external to the gaseous-discharge envelope and, as referred to above, is called the ballast. Ballasts of complex structures using inductive and capacitive reactances have been employed in AC circuits and have increased efficiencies when compared with resistive-type ballasts. Ballasts may take the form of simple chokes, transformers, autotransformers, a combination of these or other structures. Although ballast circuits of a complex nature have been used, heretofore none has operated in the manner of the present circuits, as will be explained more fully hereinafter.

The present invention operates conjunctively not only with the gaseous-discharge lamp with which it is connected, but also with a ballast, which would be required for operation of the gaseous-discharge lamp in any event. The present invention is not restricted to the type of ballast employed and should not be characterized by itself as a ballast circuit, but rather should be thought of as normally including an emergency lighting circuit.

SUMMARY OF THE INVENTION

The inventive circuit which is herein described is connected to the gaseous-discharge lamp and to the ballast and includes a voltage breakdown means, typically a diac or an SCR device, and an incandescent light located normally to illuminate the same general area as that illuminated by the gaseous-discharge lamp. In a simplified version of the circuit, a diac and an incandescent lamp are connected in series across the main electrodes of the gaseous-discharge lamp. When there is conduction between the main electrodes, the voltage applied to the diac, as determined by the lamp and ballast action, will be below the breakdown voltage for the diac. On the other hand, when there is a momentary interruption and re-establishing of power to the gaseous-discharge lamp, the lamp cannot ignite and the voltage across the diac will build up beyond the threshold level of the diac. This supplies current for lighting the emergency incandescent light.

Other embodiments include a switching arrangement for operably connecting the incandescent light to the power source so that it may be relatively free of operation of the ballast and alternately for operably connecting the incandescent light to an independent emergency source. Additional embodiments include connecting the incandescent light even during the initial period of gaseous-discharge lamp warm-up (before the discharge lamp reaches full brilliance), as well as after there has been a failure. Also, there is an embodiment described in which an emergency power system for lighting the incandescent light uses essentially the same wiring as the primary power system. And finally, there is an embodiment showing the raising of the peak applied voltage to the gaseous-discharge lamp to enhance starting, such embodiment also including an incandescent light or other resistor.

BRIEF DESCRIPTION OF THE DRAWINGS

So that the manner in which the above-recited advantages and objects of the invention, as well as others which will become apparent, are attained can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

DESCRIPTION OF PREFERRED EMBODIMENTS

Figure 1:
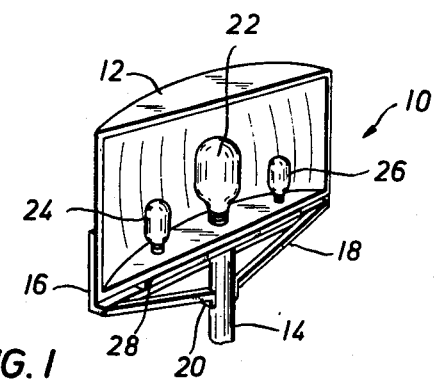
FIG. 1 is an oblique view of a typical gaseous-discharge lamp fixture incorporating a preferred embodiment of the present invention.

Now referring to the drawings and first to FIG. 1, a gaseous-discharge lamp fixture 10 is shown, such as might be used for lighting an outdoor area, typically the entrance to a building or a parking lot. Fixture 10 includes a shield 12 secured to a support post 14 by brackets 16 and 18 via bolt 20 in conventional manner. Located within shield 12 is a gaseous-discharge lamp 22, typically of the mercury-vapor variety, and two incandescent bulbs 24 and 26, which may be conveniently located within shield 12 on either side of lamp 22 in a symmetrical arrangement. Bolted to the bottom of shield 12 is housing 28, in which the ballast and an electronic circuit in accordance with the invention to be described herein is located. Appropriate leads or other connections connect lamp 22 and light bulbs 24 and 26 to the circuit components within housing 28. Appropriate power from an outside source may be brought into housing 28 through the hollow center of post 14.

Figure 2:
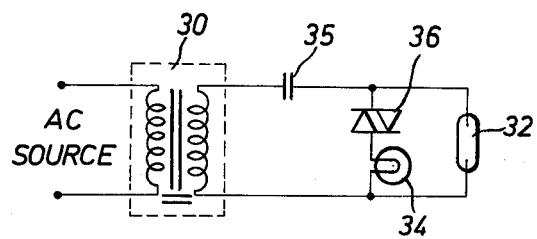
FIG. 2 is a schematic diagram of an embodiment of the present invention using a conventional transformer.

FIG. 2 shows a simplified embodiment of the invention. Applied AC power, typically at a substantially constant 440 volts, 60 Hz, is connected to a ballast transformer 30. One end of the primary and one end of the secondary may be grounded. The secondary is connected to gaseous-discharge lamp 32. Connected in parallel with lamp 32 is a series circuit combination comprising incandescent light 34 and diac 36 or other similar voltage breakdown means. A diac may be conveniently characterized as being a two-terminal, bi-directional current conducting semiconductor.

A capacitor 35 in series with the secondary output coil of ballast transformer 30 and lamp 32 may be employed to cause current limiting with the popular lead-type of ballast. Such a capacitor may also be used in some of the other embodiments hereafter discussed, but for simplicity the capacitor has been omitted.

Figure 3:
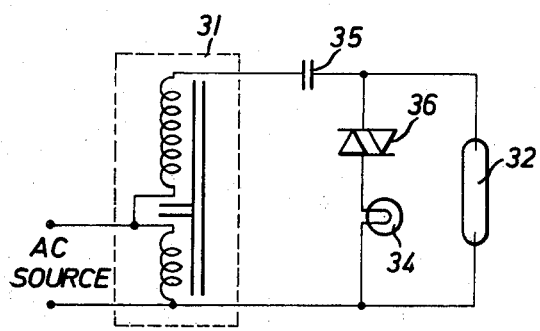
FIG. 3 is a schematic diagram of an embodiment of the present invention, similar to the one shown in FIG. 2, using an autotransformer.

FIG. 3 shows the same embodiment components as shown in FIG. 2, except the ballast transformer is illustrated as an autotransformer 31 rather than as a conventional transformer.

Figure 4:
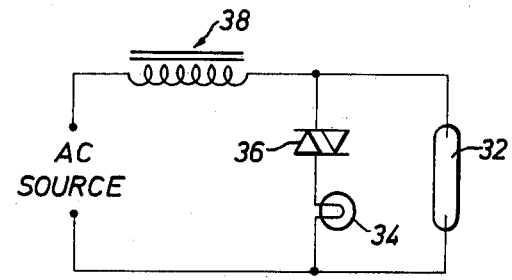
FIG. 4 is a schematic diagram of another embodiment of the present invention

Alternately to a ballast transformer, as shown in FIG. 4, a ballast 38, which may be merely an inductive choke coil, is shown connected to the applied AC source. Although strictly speaking such a coil does not have a primary and a secondary, for purposes herein the source connection may be thought of as being applied to the primary side of the coil and the lamp as being applied to the secondary side of the coil. Gaseous-discharge lamp 32, incandescent light 34 and diac 36 are connected as with the FIG. 2 arrangement.

The gaseous-discharge lamp 32 comprises typically three electrodes. At one end thereof is a starting electrode and a first main electrode located adjacent thereto. At the other end is a second main electrode connected to the starting electrode by an extremely high resistance. Ballast transformer 30 and ballast 38 may both be characterized as being current-limiting ballast means which are connected to a main electrode of lamp 32.

Figure 5:
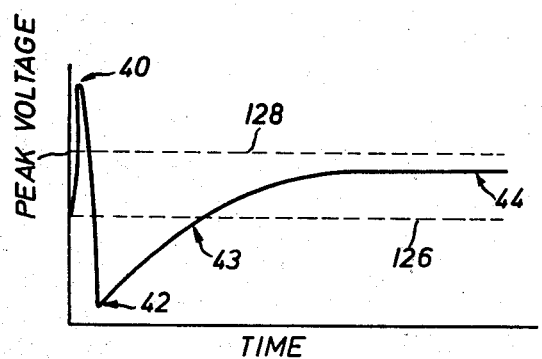
FIG. 5 is a graphic representation of the voltage applied to an inventive circuit during normal operation of the gaseous-discharge lamp with which it is associated.

In operation of any of the foregoing circuits, operating voltage is applied to the ballast, which is energized and produces a very high initial peak voltage 40, such as shown in FIG. 5 across the terminals of lamp 32. Assuming that the temperature conditions are right and that secondary voltage 40 is high enough to set up the initial glow discharge between the starting electrode and the adjacent main electrode within lamp 32, followed rapidly by the striking of the arc between the main electrodes, the output voltage from the ballast will rapidly decrease to a low voltage condition 42.

The time between the high voltage 40 level and low voltage 42 level is normally so short that to the casual observer it appears that the glow is initiated instantaneously with the application of source voltage. Also, voltage 42 is quite low and well below the threshold or breakdown voltage 128 for diac 36. Therefore, no current flows through incandescent light 34 to ignite it. The voltage gradually increases along increasing slope 43 from low voltage 42 to a substantially stable voltage level 44 which is less than the threshole level for the voltage breakdown means.

Under normal operation of gaseous discharge lamp 32, voltage from the output of the ballast will seek a stable voltage level 44 when the metallic additive in the gaseous-discharge lamp is fully vaporized and current therethrough is at a maximum value. This is because the ballast fully compensates for the negative resistance characteristics of the glowing gaseous-discharge lamp.

Upon failure, even a momentary failure, of the applied AC source to the ballast, and hence applied voltage to gaseous-discharge lamp 32, the arc in lamp 32 is extinguished. Normally a cooling period on the order of about 5 minutes is necessary before an arc discharge can occur again. However, what does happen is that the output voltage from the ballast applied to the series combination of diac and incandescent light again assumes a high level at a point which is above the voltage breakdown threshold level for diac 36. This buldup occurs since the extinguishing of the arc means that the resistance from main electrode to main electrode again becomes large. Current now passes through diac 36 and ignites incandescent lamp 34.

Again, upon extingushing of the arc in lamp 32, to the casual observer there is an immediate ignition of light 34.

If light 34 is located generally to illuminate the same area as lamp 32, there is essentially continuous lighting of this area, even though lamp 32 may be off for a period of minutes.

The diac and incandescent light do not have the negative resistance characteristics which are exhibited by lamp 32. Therefore, during the time that light 34 is lit, the voltage applied thereto from the output of the ballast remains relatively constant and is sufficiently high to again light lamp 32 when it has cooled sufficiently.

Figure 6:
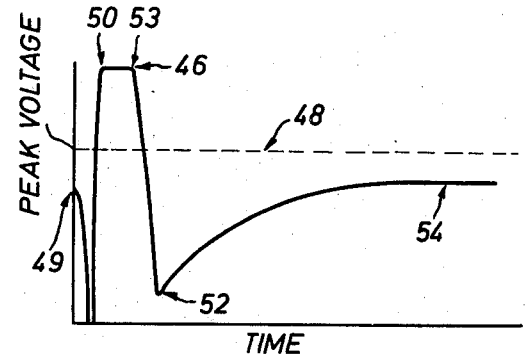
FIG. 6 is a graphic representation of the voltage applied to an inventive circuit during arc-extinguishing and restriking in the associated gaseous-discharge lamp with which it operates.

Now referring to FIG. 6, the condition of the voltage applied to the gaseous-discharge lamp in one of the foregoing circuits during refiring of the lamp may be observed. When there is a momentary power failure, the stable voltage 49 (at the level 44 established in FIG. 5) is interrupted, causing gaseous-discharge or arc lamp 32 to extinguish. When the power is re-established at point 50, the voltage applied to the lamp is a maximum level 46 (at the level 40 in FIG. 5), but the lamp is not in condition to refire. Level 46, being above the threshold level 48 of diac 36, causes current conduction therethrough and a subsequent lighting of incandescent light 34. Hence, although arc lamp 32 is extinguished there is maintained a continuity of the existence of light.

At point 53, lamp 32 has cooled down sufficiently to reach a favorable internal pressure for the restriking of the arc across lamp 32. Diac 36, being a two-terminal bi-directional current carrying semiconductor, turns on with an applied voltage 48 above its threshold level and turns off each half-cycle of the alternating current applied thereto. That is, so long as the applied voltage is above level 48, as the current goes from one half-cycle to the next the current value passes through zero, turning off conduction in one direction through diac 36 and then establishing conduction therethrough in the opposite direction. When the voltage across the terminal of lamp 32 drops from level 46 below threshold level 48 of diac 36, there is insufficient voltage to establish this conduction through the diac. This causes series-connected light 34 to extinguish. At the time of arc restriking, the voltage applied to arc lamp 32 reaches low point 52. Because some of the ions of the current-carrying additive in the arc lamp are still vaporized, when the arc is restruck the light radiating therefrom is brighter than under initial conditions, providing sufficient light to the area without assistance from light 34.

Although in the above discussion, momentary power failure has been assumed, a failure of arc lamp 32 will similarly cause light 34 to light, as above.

Figure 7:
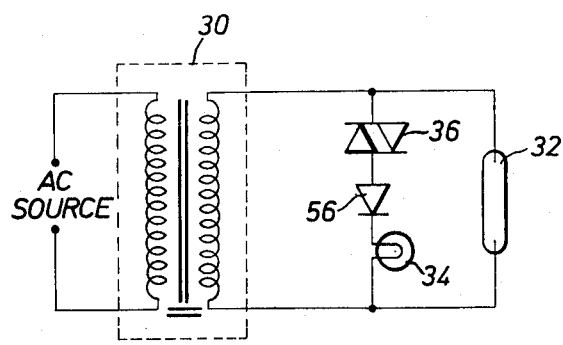
FIG. 7 is a schematic diagram of yet another embodiment of the present invention.

FIG. 7 shows a circuit employing a serially connected diac and incandescent lamp circuit together with a diode 56. This diode permits only every other half-cycle of the voltage applied to it to operate light 34. This means that the voltage rating of incandescent light 34 may be lower than for the light used in the FIG. 2 circuit, all other conditions being the same. Also, during the half-cycle in which 34 is off, no current is drawn through the ballast, thereby providing an increase in the peak voltage which is applied to gaseous-discharge lamp 32 during the time that this lamp is being restarted. The peak value of the applied voltage to a gaseous-discharge light is significant, rather than the average value. Hence, the voltage requirements of the overall ballast output are reduced.

Although the ballast means in FIG. 7 is illustrated as a transformer, as with the FIG. 2 and FIG. 3 structures, this means could take the form of a choke coil, such as coil 38 as shown in FIG. 4, or other equally suitable structure. This possibility exists for the other embodiments to be hereinafter described, as well.

Figure 8:
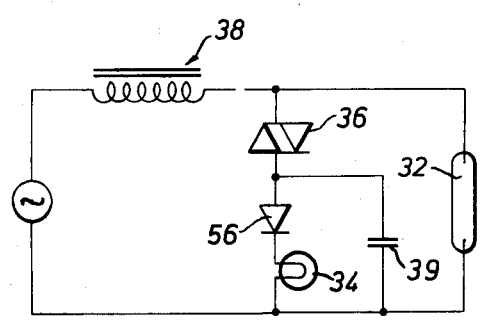
FIG. 8 is a schematic diagram of an embodiment of the present invention and including means for raising the applied starting lamp voltage.

FIG. 8 shows an embodiment of the circuit shown in FIG. 7 (illustrated to include a choke coil, rather than a transformer, merely for illustrative purpose) with the addition of capacitor 39 in parallel across diode 56 and light 34. It may be recalled that during the period while arc lamp 32 was cooling down to the conditions for restriking, between points 50 and 53 on FIG. 6, the voltage across the terminals of lamp 32 reached a level 46. Because current was passing through light 34 and its series circuit during this period, this voltage level 46 applied to lamp 32 was actually less than in the initial condition (level 40 in FIG. 5). With the addition of capacitor 39 it has been found that during the non-conductive half-cycles of diode 56, the peak voltage applied to lamp 32 is larger than otherwise, thereby aiding in the restriking action. Typically, without the capacitor, the peak voltage may be 360 volts while with the capacitor, this level is increased to 625 volts.

Of course, even without the slight drop in voltage during the period before restriking occurs, the capacitor would cause a larger peak voltage on the terminals of the arc lamp than otherwise, but this is particularly important when there is a slight voltage drop as above described since the operation of the arc lamp may be made marginal by the voltage drop without the voltage increase.

The conductive half-cycles of diode 56 allow the current to bleed off capacitor 39 to prevent excessive build-up thereon. Also, since diode 56 has a very small threshold compared with diac 36, once arm lamp 32 has an arc struck therein, and light 34 goes out, capacitor 39 will not maintain a charge, again discharging through light 34.

It should be further noted that this voltage aiding quality of capacitor 39 in this circuit exists even when a suitable and similar-value resistor is substituted in place of light 34, should there be no requirement for the emergency lighting benefit of light 34 in a particular installation.

Although illustrated with respect to the FIG. 8 circuit arrangement, the capacitor may be used similarly in the other circuits to be later described herein that have a diode similar to diode 56 or other rectifier-type means for causing half-cycles of the arc lamp terminal voltage to be blocked.

Figure 9:
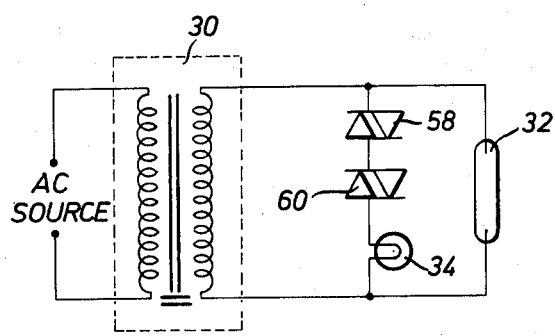
FIG. 9 is a schematic diagram of still another embodiment of the present invention.

FIG. 9 shows yet an additional embodiment of the invention employing two symmetrical voltage breakdown means, namely, diacs 58 and 60, in series with light 34. This merely reduces the voltage ratings of the diacs, but otherwise the operation is identical with the circuit shown in FIG. 2.

Figure 10:
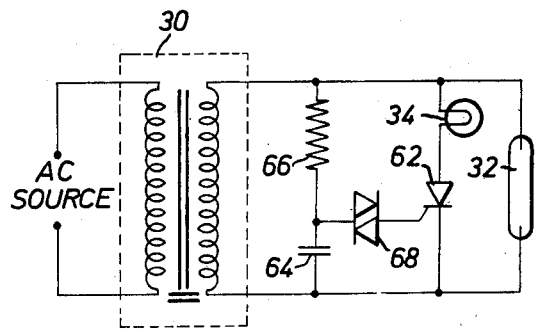
FIG. 10 is a schematic diagram of an additional embodiment of the invention.

FIG. 10 shows an embodiment utilizing for the voltage breakdown means an SCR 62 having a suitable triggering means for gating the SCR on half-cycles of the operating voltage from the ballast when there is cessation of conduction in the gaseous-discharge lamp 32. Operationally, this circuit is quite similar to that shown in FIG. 7. This triggering means comprises, conventionally, an integrator made up of capacitor 64 and resistor 66 which applies a signal through diac 68 to the gate electrode on SCR 62. The anode and cathode of SCR 62 are connected in series with incandescent lamp 34. Hence, the gate turns on the SCR when there has been failure of lamp 32, thereby lighting the incandescent light 34 on alternate half-cycles. Also, peak voltages of alternate half-cycles are applied to gaseous-discharge lamp 32 during operation of the SCR so that lamp 32 has the maximum effective operating voltage applied thereto.

Figure 12:
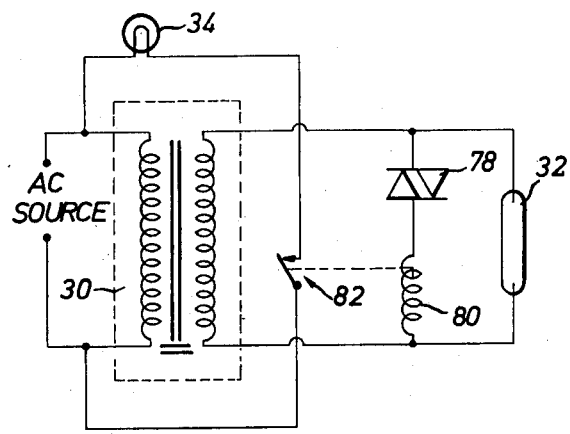
FIG. 12 is a schematic diagram of still an additional embodiment of the present invention.
Figure 11:
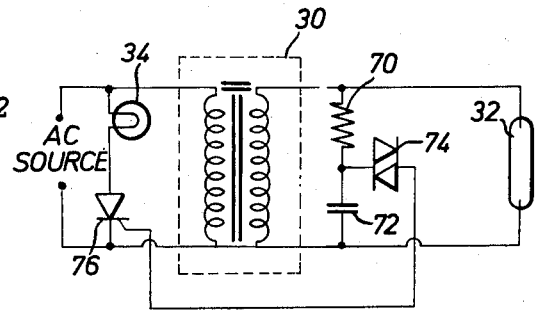
FIG. 11 is a schematic diagram of yet an additional embodiment of the present invention.
Figure 13:
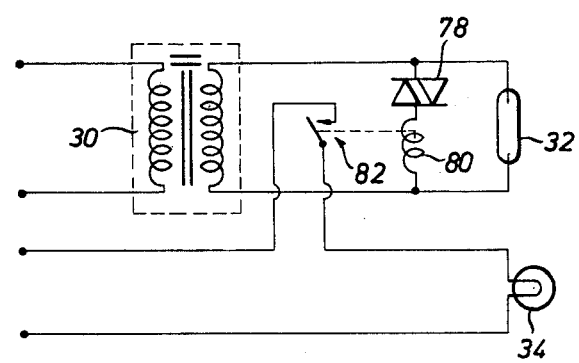
FIG. 13 is a schematic diagram of another embodiment of the present invention operating in conjunction with an emergency power supply.

Still further embodiments of the invention are shown in FIGS. 11, 12 and 13. In FIG. 11, a trigger circuit comprising a resistor 70, capacitor 72 and diac 74 is shown connected in parallel with the gaseous-discharge lamp 32, as with the FIG. 10 structure. In this embodiment, however, incandescent light 34 is connected in series with the cathode and anode of an SCR 76, the combination of which is supplied power from the primary source, rather than from the output of the ballast.

FIG. 12 shows another embodiment which places the incandescent light 34 across the input source voltage, although when light 34 comes on it is controlled by the voltage across the main electrodes of discharge lamp 32. In this case a diac 78 is connected in series with a relay coil 80, the series combination being connected in parallel across lamp 32. The contacts associated with relay coil 80 are normally open when there is no conduction through diac 78. When there is conduction through diac 78 (signifying that there is cessation of conduction in lamp 32) relay coil 80 is energized closing contacts 82, thereby applying primary power to incandescent light 34.

FIG. 13 shows the same type of operation as FIG. 12, except that upon closing of relay contacts 82 an auxiliary source is applied to the incandescent light, rather than the primary source which is applied to the gaseous-discharge and ballast circuit.

Figure 14:
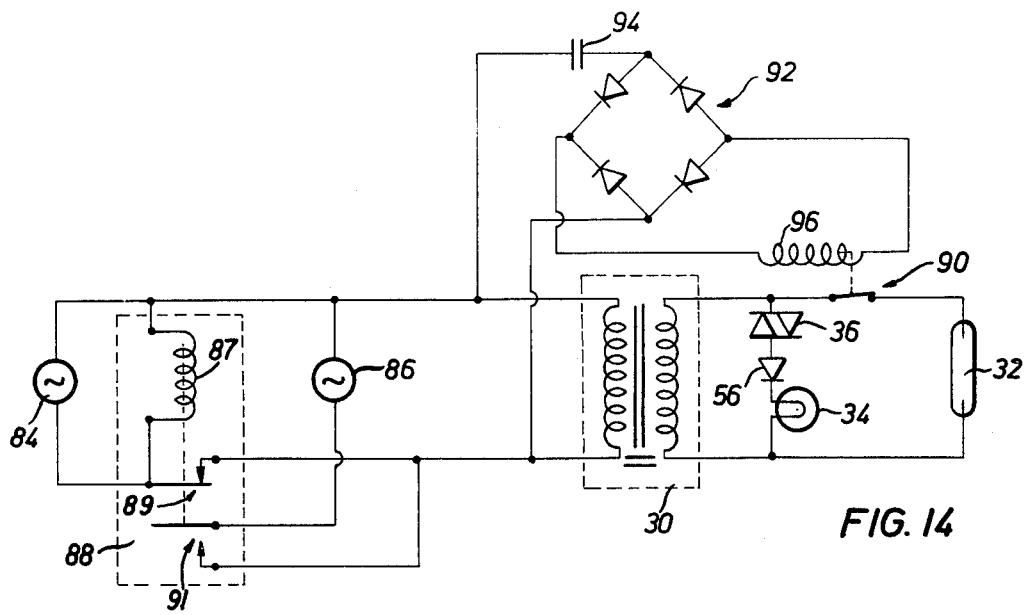
FIG. 14 is a schematic diagram of still another embodiment of the present invention operating in conjunction with an emergency power supply.

The FIG. 14 embodiment of the invention is similar to the FIG. 7 embodiment, except that this embodiment also incorporates an auxiliary emergency supply system which uses much of the same wiring as the primary system uses. Connected in parallel across main supply 84 is a normally-energized relay coil 87 of control circuit 88, the relay coil having associated therewith normally-closed contacts 89 and normally-open contacts 91. One connection from source 84 is tied directly to the ballast/arc lamp network and the other connection is connected through normally-closed contacts 89. One connection from emergency supply source 86 is likewise tied directly to the ballast/arc lamp network. However, the other connection is connected through the normally-open contacts 91.

It may be seen that upon failure of the main supply 84, the emergency supply is placed across the input of the ballast. Since there is no return for relay coil 87 when emergency supply 86 is supplying operating power to the circuit, relay coil 87 is not energized until main supply 84 is re-established. The re-establishment of the main supply reverses the switching operation from main to emergency source operation just described. Of course, any similar control and switching circuit of similar conventional design may be employed.

Connected to the secondary of ballast 30, as previously stated, is an arrangement of components similar to that shown in FIG. 7, although the variations shown in FIGS. 2–4 and 7–12 may also have been used. However, when a diode 56 is used in series with light 34, the embodiments employing a capacitor in series between the ballast and the arc lamp, such as shown in FIGS. 2 and 3, cannot be used. The illustrated components include a series combination of a diac 36, a diode 56 and incandescent light 34 connected across the output of ballast 30. There is a difference, however, in that normally closed contacts 90 are included in series with gaseous-discharge lamp 32, this series combination being connected across the output of ballast 30.

Connected across the input of ballast 30, or across the output of main source 84, is a typical bridge rectifier 92 in series with capacitor 94. Connected to the output of rectifier 92 is relay coil 96 associated with contacts 90 in the gaseous-discharge circuit.

Main supply source 84 is typically at line voltage of 60 Hz, which is effectively blocked by capacitor 94. Therefore, relay coil 96 connected to the output of rectifier 92 is not energized so long as main supply is being provided to the overall circuit. Normally closed relay contacts 90 allow ignition of gaseous-discharge lamp 32 as before. However, when main supply fails, emergency source 86 operates the circuit. Typically, the frequency of source 86 is 400 Hz, or a frequency much higher than source 84. Capacitor 94 is such that it allows this relatively high frequency to pass to bridge 92, the output of which, in turn, energizes relay coil 96. Relay coil 96 opens normally closed contacts 90 to prevent lamp 32 from re-igniting from the emergency source.

Therefore, when main supply 84 is somewhat permanently disconnected from the circuit, not just merely temporarily disconnected, incandescent light 34 is lit by the emergency supply. When main supply 84 is re-established and supply 86 is disconnected by control 88, then contacts 90 close and allow discharge lamp 32 to again be ignited. If lamp 32 is still not in a suitable state for restriking, incandescent light 34 is operated from supply 84 as described previously.

Figure 15:
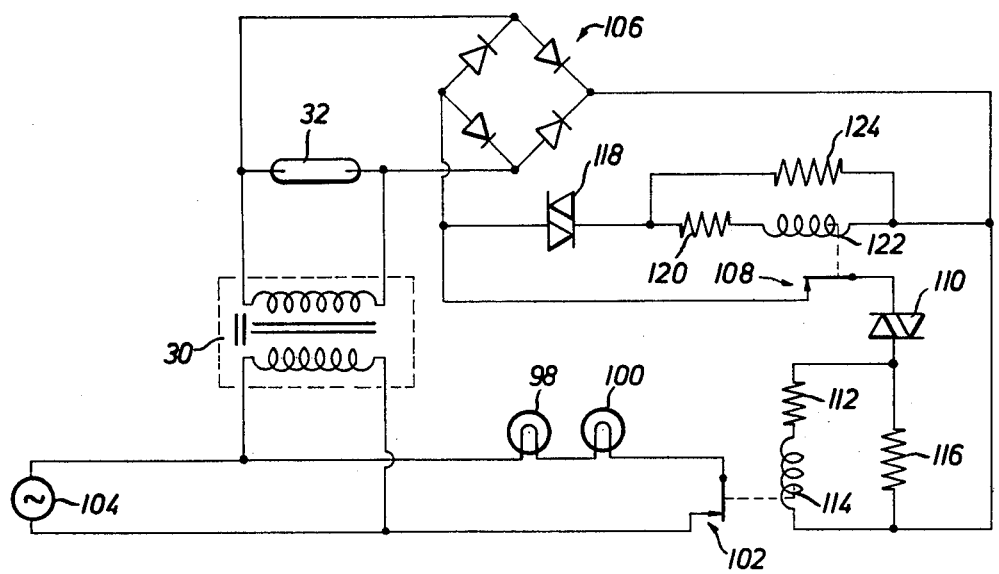
FIG. 15 is a schematic diagram of a preferred embodiment of the present invention.

FIG. 15 shows a circuit in which the associated incandescent lights 98 and 100 operate a little bit differently than the incandescent lights in the other embodiments. Notice that connected in series with incandescent lights 98 and 100 are relay contacts 102, all of which are connected in series with source 104. Relay contacts 102 are normally closed, so that upon application of voltage from source 104 lamps 98 and 100 immediately light.

Also connected to source 104 is ballast 30, as with the other embodiments, across the output of which is discharge lamp 32, as before. Also connected across the output of ballast 30 is a typical bridge rectifier 106. The output of the bridge rectifier is connected across two series of circuits. The first of these series circuits includes normally closed relay contacts 108, diac 110, resistor 112, and relay coil 114. Connected in parallel across resistor 112 and relay coil 114 is resistor 116 for a purpose to be described hereinafter. Relay coil 114 is that relay coil which is associated with contacts 102.

The other series combination connected across the output of rectifier 106 includes, in series, diac 118, resistor 120 and relay coil 122. Resistor 124 is connected in parallel across resistor 120 and relay coil 122.

To consider the operation of this circuit, again refer to FIG. 5. Immediately upon initial striking of gaseous-discharge lamp 32, the voltage output from ballast 30 is at low voltage 42. Voltage applied to diac 110 gradually increases along slope 43 until it reaches turn-on threshold level 126 of diac 110. At this time relay coil 114 is energized, opening relay contacts 102 and extinguishing incandescent lights 98 and 100. By the time this happens, the light from lamp 32 is bright enough to illuminate the area.

Should the gaseous-discharge lamp be extinguished because of momentary disconnection of power thereto, the voltage applied to diac 118 will rapidly rise until its threshold level 128 is surpassed, thereby applying energizing current to relay coil 122. When relay coil 122 is energized, relay contacts 108 associated therewith are opened, which in turn de-energizes relay coil 114. When relay coil 114 is de-energized, normally closed relay contacts 102 associated therewith are closed, applying igniting current to lights 98 and 100 from source 104.

As with the other embodiments, following the cooling period for lamp 32, an arc restrikes. Although the voltage applied to diac 118 is quickly reduced below the conduction turnoff level for diac 118 so that relay contacts 108 are closed, the voltage applied to diac 110 has temporarily been removed so that it is necessary to build up to threshold level 126 before diac 110 again conducts. Conditions at this point are as they were initially, in that threshold level 126 has to be exceeded before relay coil 114 is energized, resulting in relay contacts 102 associated therewith being opened to turn off lights 98 and 100. Also, as in the initial operating conditions, the constant level voltage under normal operation never exceeds threshold 128 to cause diac 118 to conduct. Of course, if there is again failure as before, diac 118 will conduct automatically reinitiating the cycle again as previously described.

Resistors 112 and 120, respectively, are provided to match relay coils 114 and 122 to the voltage drop requirements of operation, if required by the voltage rating of the coil. For example, if the voltage from the rectifier is 240 volts and relay coil is designed for 120 volt operation, the series resistor is added to provide a 120-volt drop. Resistors 116 and 124, respectively, provide a holding current for diacs 110 and 118, respectively, to prevent chatter of relay contacts 102 and 108, respectively, once the respective coils are positively energized.

As has been previously mentioned, in the FIG. 1 embodiment the metallic-additive lamp is shown in the same fixture as the incandescent lights. This may be convenient to provide the necessary heating in a cold environment so that the ambient temperature is conducive to conduction for the gaseous-discharge lamp once the pressure therein is right for the striking of an arc. In fact, a high resistance means that radiant heat may be employed in place of such incandescent light if the emergency lighting feature of such light is not important in a particular installation.

It may be desirable in many instances to locate the incandescent light outside of the fixture or in an entirely different location, which in no way interferes with operation of the overall lamp operation under ordinary ambient temperatures, normally about 50° F.

While several embodiments of the invention have been described, it is obvious that various substitutions or modifications of structures may be made without varying from the scope of the invention.

What is claimed is:
1. An emergency lighting system comprising:
a gaseous-discharge lamp,
means for applying electrical energy to said gaseous-discharge lamp to operate said gaseous-discharge lamp, incandescent light means, and
switching means, including at least one solid-state voltage-breakdown device, for connecting said incandescent light means to said energy-applying means when said gaseous discharge lamp is extinguished to light said incandescent light means, and for disconnecting said incandescent light means from said energy-applying means after re-striking of said gaseous-discharge lamp, in response to the voltage across the gaseous-discharge lamp approaching a stable voltage.

2. In combination with a gaseous-discharge lamp having current limiting ballast means connected thereto, an emergency lighting system comprising:
   means for applying electrical energy to the ballast means and gaseous-discharge lamp sufficient to ignite and operate said gaseous-discharge lamp,
   incandescent light means, and
   switching means, including at least one solid-state voltage-breakdown device, for connecting said incandescent light means to said energy-applying means when said gaseous-discharge lamp is extinguished to light said incandescent light means, and for disconnecting said incandescent light means from said energy-applying means after re-striking of said gaseous-discharge lamp, in response to the voltage across the gaseous-discharge lamp approaching a stable voltage.

3. In combination with a gaseous-discharge lamp having current limiting ballast means connected thereto, a continuous lighting system comprising:
   means for applying a voltage to the ballast means and gaseous-discharge lamp sufficient to ignite and operate said gaseous-discharge lamp,
   incandescent light means,
   second means for applying a voltage to the incandescent light means,
   solid-state voltage breakdown means responsive to the extinguishment of said gaseous-discharge lamp for rendering effective said second voltage applying means to light said incandescent light means to provide continuous lighting, said voltage breakdown means further responsive to the re-ignition of said gaseous-discharge lamp for rendering ineffective said second voltage applying means to extinguish said incandescent light means.

4. In combination with
   a gaseous discharge lamp having
      a first main electrode and
      a second main electrode, and
   current-limiting ballast means connected to at least one of said first and second main electrodes,
   a continuous lighting system, comprising:
      incandescent light means;
      a switch connected to form a series combination with said incandescent light means, said series combination being connected to an emergency voltage supply,
      trigger means for controlling said switch including voltage breakdown means and connected in parallel across the gaseous-discharge lamp;
      the main operating voltage establishing a voltage applied to said voltage breakdown means below its threshold level while there is conduction between the first and second main electrodes,
      cessation of such conduction resulting in voltage being applied to said voltage breakdown means above its threshold level, closedly triggering said switch and igniting said incandescent light means.

5. A continuous lighting system as described in claim 4, wherein:
   said switch is a set of normally open relay contacts, and
   said trigger means including a two-terminal bi-directional current conduction semi-conductor and the coil of the relay associated with said contacts.

6. In combination with a gaseous-discharge lamp having current limiting ballast means connected thereto, a continuous lighting system comprising:
   a main constant-voltage supply connected to the input of said ballast means;
   an emergency constant voltage supply having a frequency higher than that of said main voltage supply connected to the input of said ballast means operable upon failure of said main voltage supply;
   incandescent light means;
   first control means including voltage breakdown means responsive to the failure of the main voltage supply for rendering effective said emergency voltage supply to light said incandescent light means; and
   second control means responsive to the frequency of said emergency voltage supply for disconnecting said gaseous-discharge lamp from said emergency voltage supply.

7. In combination with
   a gaseous-discharge lamp having
      a first main electrode and
      a second main electrode, and
   current-limiting ballast means connected to at least one of said first and second main electrodes;
   a main constant-voltage supply connected to the input of said ballast; and
   an emergency constant-voltage supply having a frequency higher than that of the main supply connected to the input of the ballast means operable upon failure of said main supply;
   a continuous lighting system, comprising:
      voltage breakdown means;
      incandescent light means connected to form a first series combination with said voltage breakdown means, said first series combination being connected to the output of the ballast means;
      switch means connected to form a second series combination with the gaseous-discharge lamp, said second series combination being connected to the output of the ballast means;
      rectifier means connected to the input of the ballast means operable by a voltage at the frequency of the emergency supply and inoperable by a voltage at the frequency of the main supply, said rectifier operation opening said switch means;
      operating voltage applied across the ballast means and the gaseous-discharge lamp establishing a voltage across said voltage breakdown means below its threshold level while there is conduction between the first and second main electrodes;
      failure of the main supply operating the emergency supply, thereby opening said switch means, and applying voltage through the ballast means to said voltage breakdown means above its threshold level to ignite said incandescent light means.

8. A continuous lighting system as described in claim 7, wherein said rectifier means includes a capacitor for blocking the frequency of the main supply and allowing the frequency of the emergency supply to be passed therethrough.

9. In combination with
   a gaseous-discharge lamp having
      a first main electrode and
      a second main electrode;
   current-limiting ballast means connected to at least one of said first and second main electrodes;

a main constant-voltage supply connected to the input of said ballast; and
an emergency constant-voltage supply having a frequency different from that of the main supply and connected to the input of the ballast means operable upon failure of the main supply;
a continuous lighting system, comprising:
   first switch means connected to form a first series combination with the gaseous-discharge lamp, said first series combination being connected to the output of the ballast means;
   switch control means for opening said first switch operably connected to the emergency supply and inoperably connected to the main supply;
   incandescent light means; and
   voltage breakdown means connected to form a second series combination with said incandescent light means, said second series combination being operably connected to the main supply and the emergency supply;
   operating voltage from the main supply establishing a voltage to said voltage breakdown means below its threshold level while there is conduction between the first and second main electrodes,
   momentary failure of the main supply causing cessation of such conduction resulting in voltage from the main supply being applied to said voltage breakdown means above its threshold level to light said incandescent light means,
   failure of the main supply operating the emergency supply, thereby causing said switch control means to open said first switch means to disconnect said gaseous-discharge lamp from said emergency supply, and resulting in voltage from said emergency supply being applied to said voltage breakdown means above its threshold level to light said incandescent light means.

10. The emergency lighting system of claim 2, wherein said voltage-breakdown device has a gate, and
   further comprising switch means connected to said gate of said voltage-breakdown device, for rendering said voltage-breakdown device conductive in response to extinguishment of said gaseous-discharge lamp, thereby energizing said incandescent lamp.

11. The system of claim 10, wherein said switch means include a second semiconductor voltage-breakdown device.

12. The system of claim 10, wherein said gated voltage-breakdown device is a silicon controlled rectifier.

13. The system of claim 12, wherein said gated voltage breakdown device is a silicon controlled rectifier.

* * * * *

UNITED STATES PATENT OFFICE
CERTIFICATE OF CORRECTION

Patent No. 4,047,076      Dated September 6, 1977

Inventor(s) Albert C. McNamara, Jr.

It is certified that error appears in the above-identified patent and that said Letters Patent are hereby corrected as shown below:

Col. 3, line 20, "re-establishing" should read --re-establishment--;
Col. 5, line 59, "buldup" should read --buildup--;
Col. 5, line 64, "extingushing" should read --estinguishing--;
Col. 10, line 19, "threshold 128" should read --threshold level 128--;
Col. 11, line 67, "conduction" should read --conducting--;
Col. 14, line 25, (Claim 13) "12" should read --11--.

Signed and Sealed this

Sixth Day of December 1977

[SEAL]

Attest:

RUTH C. MASON  
Attesting Officer

LUTRELLE F. PARKER  
Acting Commissioner of Patents and Trademarks